United States Patent Office 3,364,189
Patented Jan. 16, 1968

3,364,189
REACTION OF PHOSPHONITRILIC CHLORIDE
Harry Rex Allcock, Darien, and Robert Louis Kugel, South Norwalk, Conn., assignors to American Cyanamid Company, Stamford, Conn., a corporation of Maine
No Drawing. Filed Dec. 17, 1964, Ser. No. 419,185
3 Claims. (Cl. 260—89.7)

ABSTRACT OF THE DISCLOSURE

A method for the production of a cross-linked phosphonitrilic polymer wherein a phosphonitrilic polymer is reacted with an amine, the resultant amonolized polymer is reacted with a terminally unsaturated amine and the resultant polymer is heated in the presence of a free-radical catalyst is disclosed.

Phosphonitrilic polymers and methods for their preparation have been extensively disclosed and examined in the prior art, see for example, U.S. Patent Nos. 2,876,247 and 2,866,773. The products produced by methods shown in the prior art, however, are not of sufficiently high molecular weight or thermal stability so as to enable their usage in many fields, such as the manufacture of casings for electrical equipment. Additionally, the products shown in the prior art are not resistant to basic materials, have low glass transition temperatures and contain large amounts of unreacted chlorine which cause hydrolysis of the polymers on contact with water at high temperatures, i.e., about 100° C.

We have now found that phosphonitrilic polymer mixtures can be produced, utilizing our novel method, which polymers have high glass transition temperatures, are resistant to basic materials, are substantially chlorine free and which are completely soluble in most organic solvents. That is to say, we have discovered a novel method for the production of clear, white, solid, substantially chlorine-free polymer mixtures which have high glass transition temperatures, are resistant to basic materials and which may be utilized in many applications for which the products of the prior art have been shown to be inapplicable.

It is therefore an object of the present invention to provide a novel process for the production of phosphonitrilic polymer mixtures.

It is a further object of the present invention to provide a novel process for the production of phosphonitrilic polymer mixtures which comprises reacting a phosphonitrilic chloride polymer mixture with a saturated aliphatic and/or aromatic primary and/or secondary amine to produce a polymeric phosphonitrilic amine mixture and then, if desired, reacting the resultant amine polymer mixture with a diamine or unsaturated amine to cross-link the polymer to a heat- and oxygen-stable composition.

It is a further object of the present invention to provide high molecular weight phosphonitrilic polymer mixtures which are clear, white, solid, substantially chlorine-free, base resistant and organic solvent soluble.

These and other objects will become more apparent to one skilled in the art upon reading the more detailed description of the present invention set forth hereinbelow.

The novel process

As mentioned above, we have discovered a novel process for the production of phosphonitrilic amine polymer mixtures. Our process comprises reacting a phosphonitrilic chloride polymer mixture having the formula (I) 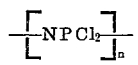

wherein $n$ is the number of units in the polymers, i.e., from about 5 through 10,000, with a primary or secondary amine having the formula (II) 

wherein R and $R^1$ are, individually, hydrogen, an alkyl group of from about 1–10 carbon atoms, inclusive, or an aryl group of from about 6–12 carbon atoms, inclusive.

By the term "polymer mixture," as used in the present specification, is meant a mixture of polymers produced from a monomer having the formula

wherein $m$ is 3 or 4, i.e., the trimer or tetramer of phosphonitrilic chloride. Upon polymerization of such a trimer or tetramer, a mixture of polymers is produced, which mixture is represented by Formula I, above. The mixture is composed of polymers of different chain lengths. That is to say, the polymer mixture may contain minor amounts of a polymer wherein $n$ equals 5, i.e., five recurring units of Formula I. The mixture will also contain polymers of 10, 20, and 10,000 recurring units of Formula I in their chain, the complete mixture of polymers constituting the feed to our novel process.

Any method can be utilized to produce the phosphonitrilic chloride polymer mixture feed of the instant invention, the particular method involved forming no part of the instant invention. Examples of methods which may be used include the thermal polymerization of phosphonitrilic chloride trimer or tetramer at 200° C.–300° C. for from 30 minutes to 100 hours, the methods disclosed in the patents listed above and hereby incorporated herein by reference or other methods known in the art which are equally efficient.

Our novel process is conducted by reacting the phosphonitrilic chloride polymer mixture represented by Formula I, above, with an amine represented by Formula II, above. The polymer mixture is reacted with the amine at a temperature and for a length of time ranging from about 25° C. for 7 days to about 200° C. for 3 hours, lower temperatures within the range necessitating the longer reaction times and higher temperatures within the range allowing shorter reaction times. These conditions are, of course, utilized in order to obtain the most complete reaction possible, i.e., in order to insure the complete conversion of the chlorine atoms in the polymer mixture to the corresponding amines in the resulting polymer mixture.

A solvent is preferably employed in our process with the use of an excess of the primary or secondary amine reactant, as such, or the use of an extraneous solvent, being sufficient. The prevention of water in the system, i.e., no more than 1%, is preferred, if not necessary, in order to inhibit the reaction of the available chlorine atoms in the polymer therewith.

Either the polymer mixture or the amine may be used as a solvent solution thereof in an inert, organic solvent. It is preferred, however, that at least one of the charge materials be used as a solution in a compound which is a solvent for the polymeric phosphonitrilic chloride mixture. Any inert solvent may be used for this purpose with such compounds as the aromatic hydrocarbons, i.e., benzene, toluene and the like, diethyl ether, tetrahydrofuran, dioxane and the like, being exemplary. The amount of solvent employed is not critical and any amount sufficient to solubilize the chloride polymer mixture can be employed.

The amount of amine represented by Formula II, above, employed is governed by the subsequent treatment of the resultant phosphonitrilic amine polymer mixture or whether an extraneous solvent is added to the reaction media. As mentioned above, the primary or secondary amine may be used as a solvent when it is desired to react all the available chlorine atoms in the phosphonitrilic chloride polymer with the amine. In such an instance, an excess of the amine over the molecular equivalent necessary to react with the available chlorine atoms is necessary. When an extraneous solvent is employed, the molecular equivalent of amine to available chlorine may be used with a slight excess of amine generally preferred to assure a complete replacement of chlorine atoms.

If, however, it is desired to subsequently react the resultant phosphonitrilic amine polymer mixture, as mentioned above and more completely set forth hereinbelow, an amount of amine less than that molecularly equivalent to the available chlorine atoms in the phosphonitrilic chloride polymer mixture, may be used, but not less than 75%.

It is also preferred to carry out our novel process in the presence of a hydrogen halide acceptor. Any compound which functions as such and is inert to the polymer mixtures and the amine may be utilized. Examples of such compounds include the trialkyl amines such as trimethyl amine, triethyl amine, etc., the triaryl amines such as triphenyl amine, etc., heterocyclic nitrogen containing compounds such as pyridine, picoline, etc. and the like.

The phosphonitrilic amine polymer mixture resulting from the above defined reaction may be recovered by washing out the hydrogen chloride acceptor salt with water or filtering said salt off by filtration, etc. The resultant phosphonitrilic amine polymer mixture may then be recovered by precipitation from a solvent into a non-solvent or filtering off the polymer if it precipitates and washing with water.

The recovered pure phosphonitrilic amine polymer mixture may then be utilized, as such, fractionally precipitated to recovered different molecular weight fractions or further reacted as set forth hereinbelow.

Examples of primary and secondary amines represented by Formula II, above which may be reacted with the phosphonitrilic chloride polymer according to the present invention include ammonia, methyl amine, ethyl amine, n-propyl amine, isopropyl amine, n-butyl amine, t-butyl amine, isobutyl amine, sec-butyl amine, pentyl amine, cyclopentyl amine, hexyl amine, cyclohexyl amine, heptyl amine, octyl amine, nonyl amine, decyl amine, dimethyl amine, diethyl amine, dipropyl amine, dibutyl amine, dipentyl amine, dihexyl amine, diheptyl amine, dioctyl amine, dinonyl amine, didecyl amine, methylethyl amine, methyloctyl amine, ethylhexyl amine, 4-amino-diphenyl, α-naphthyl amine, phenyl amine, diphenyl amine, β-naphthyl amine, xylyl amine, duryl amine, methylphenyl amine, butyl-α-naphthyl amine, mixtures thereof and the like.

The novel polymeric mixtures

Our novel process results in the production of novel polymer mixtures having the formula (III) 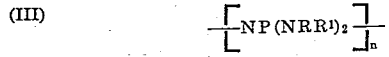

wherein $n$, $R$ and $R^1$ are as specified above in regard to Formulae I and II.

The novel polymer mixtures of the instant invention, as mentioned above, are soluble in most organic solvents such as dimethyl formamide, pyridine, anhydrous acetic acid, and the like. They are clear, white solids which are substantially chlorine-free (i.e., non-hydrolyzable). Additionally, they are resistant to basic materials such as dilute aqueous sodium hydroxide, are thermoplastic in regard to heat and have high glass transition temperatures. The mixtures generally have a $T_{10}$ value of at least 300° C., said $T_{10}$ value being defined as that at which a 10% weight loss occurs upon heating the polymeric mixture so as to increase the temperature thereof 10° C. per minute. The polymeric amine mixtures are water-resistant at room temperature.

As mentioned above, once the novel phosphonitrilic amine polymer mixtures of the instant invention are produced, they may be reacted with a diamine to produce a cross-linked polymer mixture system. Examples of diamines which may be used for this purpose include those having the formula (IV) $\qquad$ $H_2N-X-NH_2$ wherein X is an alkylene group of from 1–10 carbon atoms, inclusive, or an arylene group of from 6 to 10 carbon atoms, inclusive. Diamines represented by Formula IV include methylenediamine, dimethylenediamine, trimethylenediamine, tetramethylenediamine, pentamethylenediamine, hexamethylenediamine, heptamethylenediamine, octamethylenediamine, nonamethylenediamine, decamethylenediamine, p-xylylenediamine, p-phenylenediamine, 1,5-naphthylenediamine and the like.

Furthermore, our novel phosphonitrilic amine polymer mixtures may be reacted with various terminally unsaturated primary or secondary monoamines of the formula (V) 

wherein Y and Z are, individually, hydrogen, or a terminally unsaturated alkenyl group having from 2–10 carbon atoms, at least one of Y and Z being an alkenyl group. Examples of compounds represented by Formula V include vinylamine, divinylamine, allylamine, diallylamine, 1-butenyl-4-amine, bis(1-butenyl)-4-amine, 1-pentenyl-5-amine, bis(1-pentenyl)-5-amine, 1-hexenyl-6-amine, bis(1-hexenyl)-6-amine, 1-heptenyl-7-amine, bis(1-heptenyl)-7-amine, 1-octenyl-8-amine, bis(1-octenyl)-8-amine, 1-nonenyl-9-amine, bis(1-nonenyl)-9-amine, 1-decenyl-10-amine, bis(1-decenyl)-10-amine, and the like. The resultant products produced by the reaction of the phosphonitrilic amine polymer mixture with the primary or secondary terminally unsaturated amines may then be cross-linked by heating the polymer mixture to at least 150° C. in the presence of a free-radical generating catalyst such as azobisisobutyronitrile.

When either of these two reactions, i.e., the reaction with the diamine or the terminally unsaturated primary or secondary monoamine, are carried out, the reaction of the phosphonitrilic chloride polymer mixture with the primary or secondary amine should first be allowed to terminate. The diamine or monoethylenically unsaturated amine may then be reacted under the same reaction conditions set forth hereinabove in regard to the Formula II amine reaction, singularly or in admixture with one another, with the phosphonitrilic amine polymer mixture, in concentrations such that at least 95%, and preferably all of the available chlorine atoms of the amine polymer mixture are replaced.

While it is preferred that the phosphonitrilic amine polymer mixture first be isolated and purified before reaction thereof with the diamine or unsaturated amine, it is within the scope of our invention to add the diamine or unsaturated amine directly to the reaction media containing the phosphonitrilic amine polymer mixture to conduct the desired cross-linking. As mentioned above, of course, the diamine or unsaturated amine cannot be reacted with the phosphonitrilic amine polymer mixture unless some of the available chlorine atoms of the phosphonitrilic chloride polymer mixture have not been replaced by the original amine.

Additionally, it is also within the scope of the present invention to react the phosphonitrilic chloride polymer mixture with the primary or secondary amines represented by Formula II in admixture with the diamines or terminally unsaturated amines. Such a procedure may only be used, however, when the concentration of the diamine or unsaturated amine is less than 5% of the total amine mixture. If more than 5% is used, the reaction of the primary or secondary amine should be terminated before any diamine or unsaturated amine is added. The same limitation applies if a mixture of diamine and unsaturated amine is utilized.

The cross-linked phosphonitrilic amine polymer mixtures produced as described above are rubbery materials when slightly cross-linked, i.e., up to about 20% of available chlorine atoms reacted, and become increasingly more glassy and tough as the cross-linking thereof approaches 50%. Both the slightly cross-linked and partially cross-linked mixtures, however, have higher softening points than the phosphonitrilic amine polymer mixture per se.

The polymeric mixtures of the instant inventions may be used in the formation of films, fibers, coatings, molding compositions and the like. Additionally, the cross-linked mixtures may also be utilized for any application wherein a thermoset, rigid material or layer is desired such as for the production of electrical laminating and insulating materials, dinnerware, decorative laminates and the like. They may be blended with such additives as antioxidants, ultraviolet light absorbers, lubricants, plasticizers, dyes, pigments, other resins, etc., without detracting from the scope of the present invention.

The following examples are set forth for purposes of illustration only and are not to be construed as limitations on the present invention except as set forth in the appended claims. All parts and percentages are by weight unless otherwise indicated.

EXAMPLE 1

An insoluble phosphonitrilic choride polymer mixture is prepared by heating heptane-recrystallized cyclic phosphonitrilic chloride trimer with 1% benzoic acid for 24 hours at 200° C. and removing the soluble components from the resultant polymer mixture by extraction with toluene. 232 parts of the recovered insoluble polymer mixture, swelled with 696 parts of toluene, are then subdivided to a colloidal suspension in a blender with 1250 parts of toluene. This suspension is then mixed thoroughly with 100 parts of aniline. A marked exotherm occurs and the mixture solidifies. A further 200 parts of toluene and 50 parts of aniline are then added and the slurry is allowed to stand at 30° C., with intermittent agitation, for three days. The slurry is then treated with 3500 parts of 2B alcohol to remove unreacted aniline, aniline hydrochloride and toluene. The resultant white, crumbly residue is then rewashed with 2B alcohol and water, ground to a fine powder, washed again with 2B alcohol, and dried (weight=465 parts). The resultant polymer mixture is dissolved in 1500 parts of dimethylformamide and precipitated into 5000 parts of water. The precipitation from dimethylformamide is then repeated.

The polymer mixture is a white, slightly hygroscopic powder.

*Analysis.*—$C_{12}H_{12}N_3P$: theory C, 63.00; H, 5.20; N, 18.30; P, 13.50; Cl, 0. Found: C, 62.98; H, 5.62; N, 18.60; P, 13.61; Cl, 0.

The structure of this polymer mixture is confirmed by the presence of a peak at 1220 cm.$^{-1}$ in the infra-red spectrum, due to the —P=N— vibration, and by the presence of a $P^{31}$ NMR peak at +20 p.p.m. The reduced specific viscosity of the polymer mixture, in dimethylformamide at 30° C., is 0.08 dl./g. and the molecular weight, determined by light scattering, is 26,000. Thermogravimetric analysis shows that the $T_{10}$ value in nitrogen is 249° C. and in air is 245° C. The glass transition temperature is 150° C. and the melting temperature is 200° C. to 250° C. The mixture is stable to water.

EXAMPLE 2

A soluble phosphonitrilic chloride polymer mixture (31.8 parts) is isolated by fractional precipitation of a mixture of phosphonitrilic chloride polymers prepared by thermal polymerization of cyclic phosphonitrilic chloride trimer at 250° C. for 11 hours. The soluble polymer mixture is then dissolved in dry benzene (670 parts). After two days, the polymer mixture begins to gel very slightly. To the stirred polymer mixture solution is then added 110 parts of aniline and the resultant mixture is refluxed at 84° C. for 48 hours. The slurry is then treated with ethanol, and the liquid component is filtered off. The insoluble residue is then dissolved in dimethylformamide and precipitated into ethanol. This purification step is repeated three times. The final dried polymer mixture is identical in properties by analysis to that prepared in Example 1.

Following the procedure of either Example 1 or Example 2, various amines were reacted with phosphonitrilic chloride polymer mixtures under various conditions. The conditions and properties of the resultant phosphonitrilic amine polymer mixtures is set forth in Table I, below.

TABLE I

| Ex. | (PNCl$_2$) polymer mixture produced as per Ex. No. | HNRR [a] | | T, °C. | Time | Reduced specific viscosity, dl./g. | Molecular weight [b] | T$_{10}$, °C. | | Glass transition temp., °C. | H$_2$O effect | S.P.,[c] °C. |
|---|---|---|---|---|---|---|---|---|---|---|---|---|
| | | R | R$^1$ | | | | | Air | N$_2$ | | | |
| 3 | 1 | C$_6$H$_5$ | CH$_3$ | 100 | 28 hours | 0.07 | 30,000 | 240 | 252 | 140 | None | 230 |
| 4 | 2 | H | H | 25 | 7 days | 0.40 | 60,000 | 280 | 310 | 40 | do | 220 |
| 5 | 2 | CH$_3$ | H | 150 | 8 hours | 0.35 | 52,000 | 262 | 287 | 112 | do | 219 |
| 6 | 2 | CH$_3$ | CH$_3$ | 175 | 5 hours | 0.46 | 71,000 | 290 | 325 | 114 | do | 245 |
| 7 | 1 | C$_2$H$_5$ | H | 75 | 5 days | 0.08 | 24,500 | 230 | 245 | 122 | do | 240 |
| 8 | *1 | C$_4$H$_9$ | H | 75 | do | 0.11 | 27,000 | 235 | 249 | 133 | do | 240 |
| 9 | 2 | (d) | (d) | 80 | do | 0.50 | 75,000 | 300 | 325 | 150 | do | 250 |
| 10 | 1 | C$_6$H$_{11}$ | CH$_3$ | 100 | 24 hours | 0.03 | 16,000 | 210 | 227 | 70 | do | 245 |
| 11 | 1 | C$_{10}$H$_{21}$ | H | 100 | do | 0.04 | 20,000 | 220 | 229 | 65 | do | 230 |
| 12 | 2 | α-C$_{10}$H$_7$ | C$_2$H$_5$ | 125 | 12 hours | 0.54 | 80,000 | 300 | 350 | 142 | do | 255 |
| 13 | 1 | H | C$_{12}$H$_9$ | 200 | 3 hours | 0.10 | 26,000 | 237 | 254 | 148 | do | 220 |
| 14 | †2 | C$_6$H$_5$ | C$_6$H$_5$ | 150 | 6 hours | 0.25 | 43,000 | 258 | 280 | 151 | do | 200 |
| 15 | ‡1 | C$_{10}$H$_{21}$ | C$_{10}$H$_{21}$ | 200 | 3 hours | 0.08 | 19,000 | 220 | 227 | 58 | do | 235 |
| 16 | 1 | C$_8$H$_9$ | H | 95 | 4 days | 0.07 | 28,000 | 238 | 250 | 68 | do | 230 |

\* Soluble components not removed from chloride polymer mixture.
† Insoluble components not removed from chloride polymer mixture.
‡ Cyclic phosphonitrilic chloride tetramer used instead of trimer.
AN=aniline.
MA=methyl amine.
S.P.=softening point.

[a] At 30° C. in dimethylformamide.
[b] Determined by light scattering.
[c] Temperature at which solid polymer mixture changes to liquid.
[d] A mixture of 50% aniline and 50% methylamine was utilized in this example.
(PNCl$_2$)=phosphonitrilic chloride.

EXAMPLE 17

116 parts of an insoluble phosphonitrilic chloride polymer mixture produced from cyclic phosphonitrilic chloride trimer as in Example 1, are swelled and subdivided in 1000 parts of benzene. To this stirred mixture are added 130 parts of dimethylamine, and the mixture is refluxed for 5 days. 60 parts of ethylene diamine are then added and the mixture is then stirred and heated at reflux temperature for an additional 4 days. The resultant precipitate is filtered off and is washed with a large excess of water to remove all the components except the polymer mixture. The product is a leathery, off-white, cross-linked resin.

EXAMPLES 18–20

Following the procedure of Example 17, three samples, each composed of 150 parts of an insoluble phosphonitrilic chloride polymer produced from cyclic phosphonitrilic chloride trimer as in Example 1, are reacted, individually, with hexamethylenediamine, decamethylenediamine and p-phenylenediamine, respectively. The resultant polymeric mixtures, in each instance, are cross-linked, tough, flexible, off-white resins.

EXAMPLE 21

116 parts of a soluble phosphonitrilic chloride polymer mixture produced from cyclic phosphonitrilic chloride trimer as in Example 2 are dissolved in 1000 parts of benzene with agitation. To this stirred mixture are added 180 parts of propylamine. The resultant mixture is then stirred and refluxed for 3 days. Fifty-seven parts of allylamine are then added, and the resultant mixture is stirred at 60° C. for 4 days. A precipitate forms, is filtered off, and is washed with 10 parts of water to remove amine hydrochloride. The recovered polymer mixture is purified by precipitation from dimethylformamide into water. The polymer mixture is then cross-linked by heating at 150° C. with 10% ditertiarybutylperoxide for 12 hours. The product is a hard resin.

EXAMPLES 22 AND 23

Following the procedure of Example 21, two samples, each constituting 100 parts of a soluble phosphonitrilic chloride polymer mixture produced from cyclic phosphonitrilic chloride trimer as in Example 2, are reacted, individually, with diallylamine and 1-decenyl-10-amine, respectively. The resultant products are then cross-linked by heating them at 175° C. with azobisisobutyronitrile to produce hard, tough, polymeric resins.

EXAMPLE 24

116 parts of a soluble phosphonitrilic chloride polymer mixture, produced from cyclic phosphonitrilic chloride trimer as in Example 2, are dissolved in 1000 parts of benzene and 300 parts of butylamine and the resultant mixture is stirred and refluxed for 2 days. A mixture of 6 parts of ethylene diamine and 5.7 parts of allylamine are then added to the reaction vessel and the mixture is refluxed for 1 day. 50 parts of butylamine are then added to substitute any residual chlorine and the mixture is refluxed for an additional 24 hours. The resultant precipitate is filtered off and washed with a large excess of water to remove amine salts. The residue is a rubbery, tan-colored polymer mixture. It is cured by mixing with 5 parts of ditertiarybutylperoxide followed by heating at 150° C. for 7 hours, to a cross-linked, solid, tough resin.

EXAMPLE 25

116 parts of a soluble phosphonitrilic chloride polymer mixture, produced from cyclic phosphonitrilic chloride trimer as in Example 2, in 1000 parts of dry pyridine are mixed with a mixture of 110 parts of propylamine and 30 parts of p-phenylene diamine. The mixture is stirred at 25° C. for 7 days and the resultant precipitate is filtered off, washed first with benzene to remove residual pyridine, then with a large excess of water to remove pyridine hydrochloride. The residue is a hard, rubbery, cross-linked phosphonitrilic polymer mixture.

EXAMPLE 26

116 parts of an insoluble phosphonitrilic chloride polymer mixture produced from cyclic phosphonitrilic chloride trimer as in Example 1, are swelled and subdivided to a colloid in 1000 parts of benzene. This suspension is then treated with a mixture which consists of 160 parts of dimethylamine, and 40 parts of allylamine. The resultant mixture is refluxed for 5 days and the precipitate which forms is then filtered off, washed with water and dried. A rubbery resin mixture is recovered and cured by heating with ditertiarybutylperoxide at 180° C. for 4 hours to form a tough, cross-linked resin.

EXAMPLE 27

Example 26 is repeated in all essential respects except that the insoluble chloride polymer mixture is treated with a mixture of 160 parts of dimethylamine, 20 parts of propylenediamine and 30 parts of allylamine. The product is a hard, leathery, polymer mixture which is then cured by heating at 150° C. with 5% ditertiarybutylperoxide for 24 hours to a tough, cross-linked resin.

We claim:
1. A process for the production of a hard, cross-linked polymeric mixture which comprises reacting a polymeric mixture having the formula

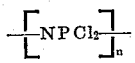

wherein $n$ is the number of units in the mixture and ranges from about 5 through 10,000, with at least 75% but less than 100% of that molecularly equivalent to the available chlorine atoms of said mixture, of an amine having the formula

wherein R and $R^1$ are, individually, selected from the group consisting of hydrogen, an alkyl radical of 1–10 carbon atoms, inclusive, and an aryl radical having from about 6–12 carbon atoms, inclusive, at a temperature ranging from about 25° C. to about 200° C. and at a corresponding length of time ranging from about 7 days to 3 hours, reacting the resultant amonolized phosphonitrilic polymer mixture with sufficient terminally unsaturated amine to replace at least 95% of the available chlorine atoms in said amonolized polymer mixture, said unsaturated amine having the formula

wherein Y and Z are, individually, selected from the group consisting of hydrogen and an alkenyl radical having from 2–10 carbon atoms, inclusive, at least one of X and Y being an alkenyl radical and cross-linking the resultant polymer mixture in the presence of a free-radical generating catalyst at a temperature of at least 150° C.

2. A process according to claim 1 wherein said unsaturated amine is allyl amine.

3. The product produced by the process of claim 1.

References Cited

UNITED STATES PATENTS

| 2,109,491 | 3/1938 | Lipkin | 260—2 |
| 2,214,769 | 9/1940 | Lipkin | 260—2 |
| 3,259,817 | 7/1966 | Adany | 260—2 |
| 3,329,663 | 7/1967 | Allcock et al. | 260—89.7 |

FOREIGN PATENTS

| 1,270,800 | 7/1961 | France. |
| 788,785 | 1/1958 | Great Britain. |

OTHER REFERENCES

French, "Dissertation Abstracts," vol. 24, June 1964, p. 4993–4994.

SAMUEL H. BLECH, *Primary Examiner*.